United States Patent [19]
Kershaw

[11] 3,938,973
[45] Feb. 17, 1976

[54] AIR FILTER
[76] Inventor: Eli J. Kershaw, 6284 25th St., South, St. Petersburg, Fla. 33707
[22] Filed: Apr. 19, 1974
[21] Appl. No.: 462,575

[52] U.S. Cl. ............... 55/501; 55/511; 55/DIG. 5; 55/DIG. 31
[51] Int. Cl.² ........................................ B01D 46/10
[58] Field of Search ............ 55/490, 491, 492, 493, 55/495, 496, 499, 501, 509, 511, 512, 514, DIG. 5, DIG. 31; 229/30, DIG. 4

[56] References Cited
UNITED STATES PATENTS

| | | | |
|---|---|---|---|
| 2,965,197 | 12/1960 | Dow et al. | 55/511 |
| 3,003,581 | 10/1961 | Greason | 55/514 |
| 3,023,839 | 3/1962 | Best | 55/509 X |
| 3,107,990 | 10/1963 | Getzin | 55/491 |
| 3,154,393 | 10/1964 | Klein et al. | 55/501 |
| 3,388,535 | 6/1968 | Nash | 55/492 |
| 3,447,691 | 6/1969 | Andrews et al. | 55/511 X |

*Primary Examiner*—Frank W. Lutter
*Assistant Examiner*—David L. Lacey
*Attorney, Agent, or Firm*—Finnegan, Henderson, Farabow & Garrett

[57] ABSTRACT

An air filter panel comprising a filter element of fibrous material supported at its marginal edges by a stiff paper frame is provided. The strip of stiff paper is scored along two spaced longitudinal lines and folded away from the longitudinal lines to form a trough for receiving the filter element, the strip also being folded transversely to form a closed configuration surrounding the filter element to receive the marginal edges of the filter element in the trough. The frame is triangular in cross section with an outer wall, a flat rear wall extending inward from the outer wall toward the filter element, and an inclined front wall extending inward from the outer wall toward the filter element and sloping toward the rear wall. The front wall terminates in a flange disposed in a parallel relationship with the rear wall. The flange is secured to the rear wall with the filter element compressed therebetween to hold the frame and filter element together.

13 Claims, 10 Drawing Figures

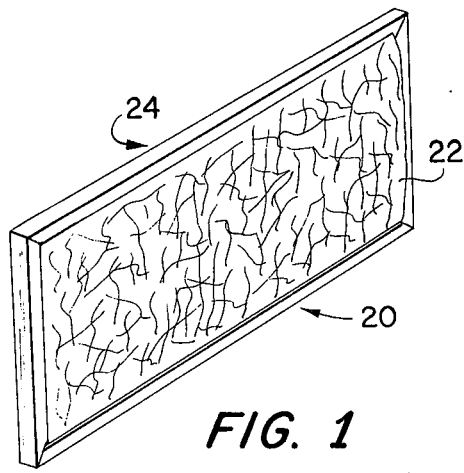
FIG. 1
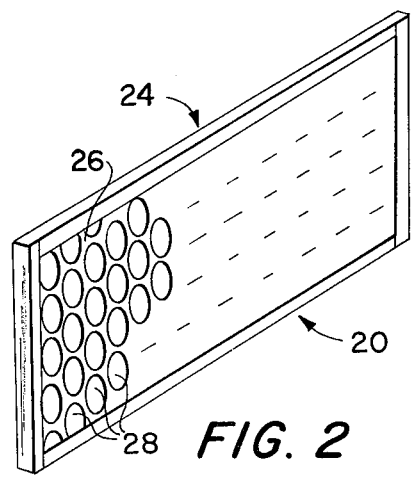
FIG. 2
FIG. 3
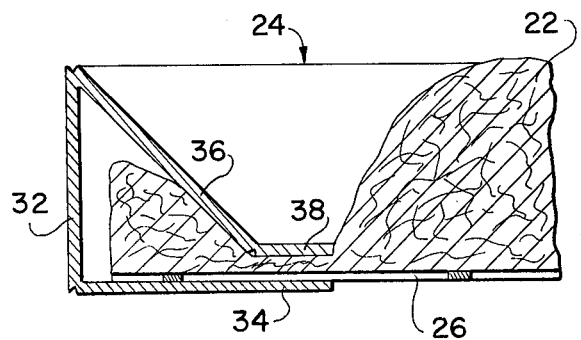
FIG. 4
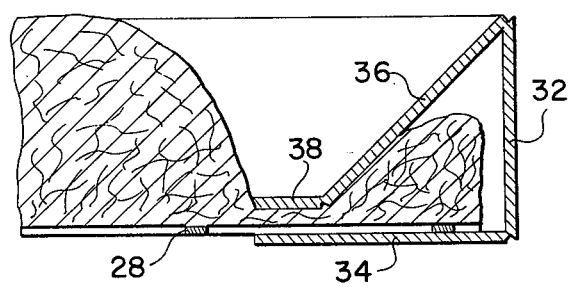
FIG. 5
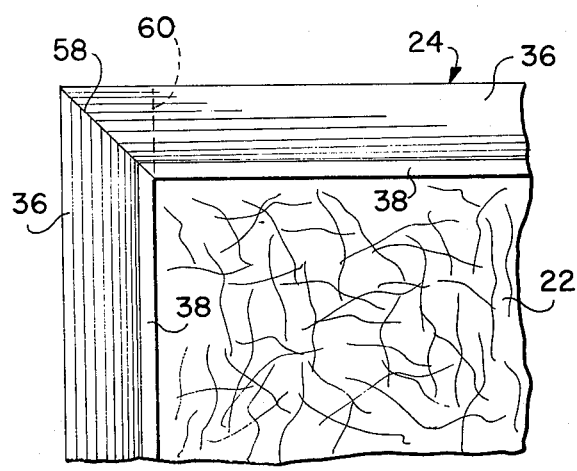
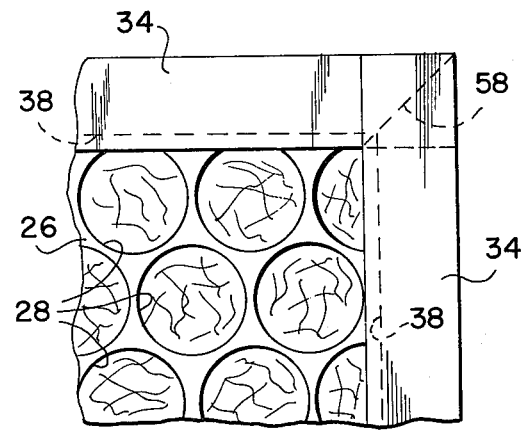

AIR FILTER

The present invention relates to an air filter and, more particularly, to an air filter panel for use in air conditioning systems to remove particles of dust and other foreign material from air circulated by the systems.

A conventional air conditioning unit for heating or cooling of a building typically includes a housing or duct provided with a relatively large passage for the flow of air to be filtered. The housing or duct is usually provided with a frame-like support in the form of a plurality of flat plates located about the edge of the air flow passage for receiving a removable air filter panel. The frame-like support plates hold the filter panel in place during operation of the air conditioning unit and facilitate insertion of the panel into the air conditioning unit and removal of the panel from the unit for replacement.

To enhance the effectiveness of the air conditioning unit, it is extremely important to provide an air filter which is efficient in removing dust particles and other foreign material from the air circulated by the unit. The removal of dust and other particles from the air avoids the deleterious effects of this undesirable matter on the components of the unit and eliminates the circulation of dust particles and other foreign material into the areas of the building served by the unit. Thus, it is essential to provide an air filter panel which fits snugly into the frame-like support of the air conditioning housing or duct so that the air circulated by the unit will pass through the air filter and not around it. In addition, it is desirable that the air filter be sufficiently rigid to retain its shape in use and designed to guide the air flow through the filter.

Further, in the operation of the air conditioning unit, the air filter panels should regularly be removed and replaced with new panels as the panels become filled with dirt and lose effectiveness. Accordingly, in the case of an air filter intended to be disposable, the filter should be inexpensive to manufacture.

The present invention achieves the above objectives by providing an air filter comprising a filter element of fibrous material supported at its marginal edges by a stiff paper frame which is arranged to present a flat, rear surface for snug, substantially air-tight engagement with the frame-like support plates around the air flow passage of a conventional air conditioning unit and an inclined front wall which directs the air flow toward the filter element.

In accordance with the invention, the frame comprises a strip of stiff paper folded along two spaced longitudinal lines to form a trough for receiving the filter element and also folded transversely to form a closed configuration surrounding the filter element to receive the marginal edges of the filter element in the trough. The frame includes an outer wall, a flat, rear wall extending inward from the outer wall toward the filter element, and a front wall extending inward from the outer wall toward the filter element and sloping toward the rear wall. The front wall terminates in a flange disposed in a parallel relationship with the rear wall. The flange is secured to the rear wall with the filter element compressed therebetween to hold the frame and filter element together.

A preferred embodiment of the air filter includes a backing sheet for the filter element which includes a plurality of air flow openings and is supported at its marginal edges by the frame. The backing sheet is located between the filter element and the rear wall of the frame.

Preferably, the frame is substantially a right triangle in cross section with its outer wall comprising one leg of the triangle, its rear wall comprising the other leg of the triangle, and its front wall comprising the hypotenuse. In an alternative embodiment, the angle between the outer wall and rear wall is an obtuse angle to facilitate storage or transportation of the air filters in a stacked arrangement.

In a preferred embodiment of the air filter, the stiff paper strip is scored along the two spaced longitudinal lines on the same side of the strip to facilitate formation of the strip into the triangular cross section of the frame. The strip is folded away from the longitudinal lines to form the outer wall, front wall and rear wall of the frame. The stiff paper strip is also scored along an additional line on the opposite side of the strip adjacent to the edge of the front wall to define the flange. The flange is folded away from the additional longitudinal line and disposed in a parallel relationship with the rear wall. In addition, the stiff paper strip is scored along transverse lines at predetermined spaced locations and folded away from the transverse lines to form the paper strip into the closed configuration of the frame. Preferably, the stiff paper strip is partially broken or separated along the longitudinal and transverse lines to prevent spring back of the strip from its folded, closed configuration.

The frame of the air filter presents a flat rear wall which is completely suitable for engagement with the flat, frame-like support plates around the air flow passage of a conventional air conditioning unit. The air flow through the filter urges the flat, rear wall of the filter frame into sealing engagement with the flat, frame-like support plates with the result that the entire air flow is directed through the filter element. The front, sloped wall of the filter frame serves as a baffle which directs the air flow toward the filter element. In addition, the triangular configuration of the frame allows the thickness of the filter element to be substantially equal to the width of the outer frame wall to provide optimum efficiency in the operation of the air filter.

The accompanying drawings illustrate preferred embodiments of the invention and, together with the description, serve to explain the principles of the invention.

Of the drawing:

FIG. 1 is a perspective view of the front face of an air filter panel constructed in accordance with the principles of the present invention including a filter element of fibrous material and a frame which supports the filter element at its marginal edges;

FIG. 2 is a perspective view of the rear face of the air filter panel of FIG. 1 illustrating a backing sheet for the fibrous filter element supported by the frame;

FIG. 3 is an enlarged sectional view of the air filter panel of FIGS. 1 and 2 illustrating the triangular configuration of the frame which holds the filter element and backing sheet;

FIG. 4 is an enlarged front view of a corner of the air filter panel;

FIG. 5 is an enlarged rear view of the same corner of the air filter panel;

Figure 6:
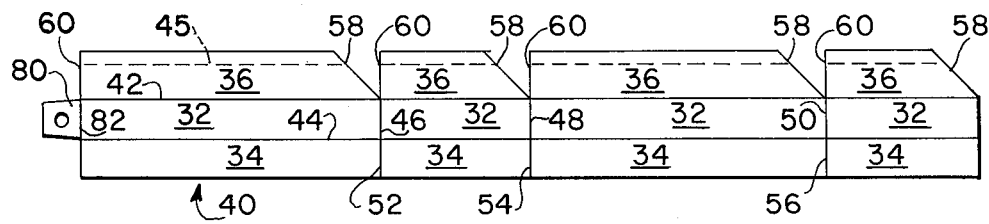
FIG. 6 illustrates an elongated strip of stiff paper which is notched, cut, and scored at appropriate locations to facilitate folding of the strip to form the frame of the air filter panel.

Referring to FIG. 1, an air filter panel, generally 20, constructed according to the principles of the present invention comprises a filter element 22 of fibrous material, e.g., glass fibers, and a frame 24 which supports the filter element at its marginal edges. Preferably, filter element 22 and frame 24 are rectangular in shape to provide a rectangular air filter panel. The exterior dimensions of the air filter panel are standardized to allow the panel to be used in conventional air conditioning units.

The filter material preferably consists of a mixture of coarse and fine fibers, e.g., fiberglass, which is formed into a mass of substantially uniform thickness. The mass of fibers is secured together by a suitable bonding agent which will not have any appreciable effect on the air flow through the filter material.

As shown in FIG. 2, air filter panel 20 includes a porous backing sheet 26, e.g., a thin metal or plastic sheet provided with a plurality of closely spaced, circular air flow openings 28. The backing sheet is preferably rectangular in shape and supported at its marginal edges by frame 24.

In accordance with the invention, the frame comprises a strip of stiff paper folded along two spaced longitudinal lines to form a trough or channel for receiving the filter element and also folded transversely to form a closed configuration surrounding the filter element to receive the marginal edges of the filter element in the trough or channel. The frame includes an outer wall, a flat rear wall extending inward from the outer wall, and a front wall extending inward from the outer wall toward the filter element and sloping toward the rear wall. The front wall terminates in a flange disposed in a parallel relationship with the rear wall, and the flange is secured to the rear wall with the filter element compressed therebetween to hold the frame and filter element together.

In the preferred embodiment, the strip of stiff paper is folded transversely at predetermined spaced locations to provide four frame sections which form a closed, rectangular configuration to surround filter element 22 and support the marginal edges of the filter element. Each frame section is substantially a right triangle in cross section. As embodied and shown in FIG. 3, frame 24 includes an outer wall 32, a first side wall 34 at the rear of the frame extending perpendicularly inward from outer wall 32 toward filter element 22, in a generally parallel relationship with the filter element, and a second side wall 36 at the front of the filter frame extending inward from outer wall 32 toward the filter element and sloping toward first side wall 34. Outer wall 32 and rear wall 34 constitute the legs of the right triangle, while front wall 36 constitutes the hypotenuse of the triangle.

As shown in FIG. 3, front wall 36 terminates in a flange 38 disposed in a parallel relationship to rear wall 34. Flange 38 is secured to rear wall 34 with conventional means, e.g., by bonding with a suitable adhesive, or by mechanically fastening the flange to the rear wall with staples, rivets, or other suitable fasteners. In the preferred embodiment, an adhesive, commonly known as hot melt, is used to bond flange 38 to rear wall 34 with filter element 22 compressed between the flange and rear wall to hold the frame and filter element together. Backing sheet 26 is preferably disposed between filter element 22 and rear wall 34 of the filter frame.

FIG. 6 illustrates an elongated strip 40 of stiff paper, e.g., Kraft lined paper, which is notched, cut, and scored to facilitate formation of filter frame 24 when the paper strip is appropriately folded. Paper strip 40 is scored on the same side along two spaced longitudinal lines 42 and 44 which extend for the entire length of the paper strip. In addition, paper strip 40 is scored along a longitudinal line 45 on the opposite side of the paper strip adjacent to the upper edge of the strip to define flange 38 of the filter frame.

Stiff paper strip 40 is also scored along spaced, transverse lines 46, 48 and 50, between longitudinal score lines 42 and 44, to define four outer wall sections 32. In addition, paper strip 40 is completely cut along transverse lines 52, 54 and 56, i.e., from longitudinal score line 44 outward to the lower edge of the paper strip, to define four rear wall sections 34.

Finally, the stiff paper strip is provided with a plurality of notches which extend from the upper edge of the strip to longitudinal score line 42 to define four front wall sections 36. Each notch defines an inclined edge 58 and a perpendicular edge 60. Referring to FIG. 4, when the paper strip is folded into a rectangular configuration, perpendicular edge 60 at each corner of the frame underlies inclined edge 58.

Figure 7:
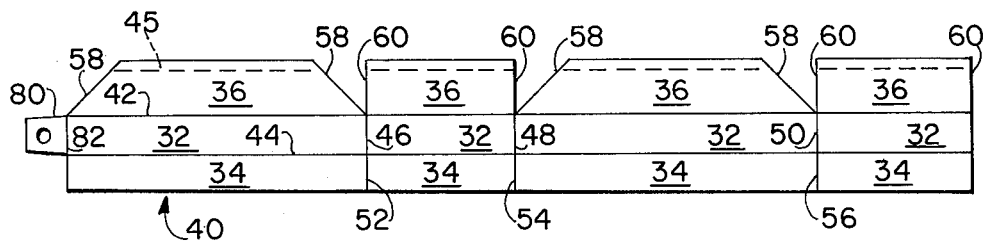
FIG. 7 illustrates a slight modification of the elongated paper strip of FIG. 6 which can also be folded to form the frame of the air filter panel.

FIG. 7 illustrates an alternative embodiment of elongated stiff paper strip 40 which is suitable for formation of filter frame 24. The only difference between the strips of FIGS. 6 and 7 is in the formation of the notches which define front wall sections 36. In the embodiment of FIG. 6, each front wall section 36 is cut away at one of its ends to provide the required notches. In the embodiment of FIG. 7, however, alternate front wall sections 36 are cut away at both ends thereof to provide the notches, while the intervening front wall sections are undisturbed.

As shown in FIGS. 6 and 7, a tab 80 is formed at one end of the stiff paper strip. A transverse score line 82 is provided to facilitate folding of tab 80 relative to the strip. The tab is received in the opposite end of the frame when paper strip 40 is folded into its closed, rectangular configuration.

In the manufacture of the air filter panel, the elongated paper strip is normally supplied from a large roll (not shown) and is initially formed into the desired frame configuration to receive the other filter components. After insertion of the filter element and backing sheet into the frame, the filter components are firmly secured together to complete the assembly of the air filter panel. The following detailed description specifically concerns a filter panel in which a bonding agent is used to secure the components together.

The elongated paper strip is advanced from its supply roll through an applicator (not shown) which applies an adhesive, e.g., hot melt, along opposite edges of the strip which correspond to flange 38 and the outer edge of rear wall 34 of the filter frame. The hot melt is applied at a predetermined temperature, e.g., 300° to 400°F, required to melt or activate the adhesive. Then the paper strip is passed between a pair of cooling rollers (not shown) to temporarily de-activate the adhesive to avoid inadvertent removal of the adhesive from the paper strip in subsequent manufacturing steps.

Next, the elongated paper strip is advanced to a stamping station where an appropriate set of dies simultaneously form the transverse score lines, cuts, and notches in the paper strip. At the same time, or in a later step, the paper strip is cut to the desired length and tab 80 is formed at one end of the strip. The cut paper strip is then advanced through a set of rotary cutting knives which form longitudinal score lines 42 and 44 on the same side of the paper strip and longitudinal score line 45 on the opposite side of the paper strip.

Subsequently, paper strip 40 is advanced to a conventional roll forming machine which shapes the paper strip into a channel-like configuration by folding the strip along longitudinal score lines 42, 44 and 45. In each instance, the portions of stiff paper strip 40 located adjacent to the longitudinal score lines are folded away from the score lines. As a result of this folding technique, the stiff paper strip is partially broken or separated along the longitudinal score lines to counteract the tendency of the stiff paper strip to spring back from its folded configuration.

After paper strip 40 is folded longitudinally into a channel-like configuration, it is again folded, either manually or by suitable automatic apparatus (not shown), along transverse score lines 46, 48 and 50 into a closed, rectangular configuration. Again, in the case of each transverse score line, the portions of the paper strip adjacent to the transverse score lines are folded away from the score lines. As a result, the stiff paper strip is partially broken or separated along transverse score lines 46, 48 and 50 to overcome the tendency of the stiff paper strip to spring back from its closed, rectangular configuration. As shown in FIG. 5, rear wall sections 34 overlap at each corner of the filter frame. In addition, tab 80 is folded away from transverse score line 82 and is inserted into the end of the trough or channel at the opposite end of the paper strip.

After stiff paper strip 40 is formed into its rectangular frame configuration, backing sheet 26 is laid into the partially formed filter frame on rear wall sections 34 with its marginal edges inside the channel defined by the walls of the frame. Next, filter element 22 is inserted into the partially formed filter frame on backing sheet 26 with its marginal edges also received in the channel defined by the frame walls.

Figure 8:
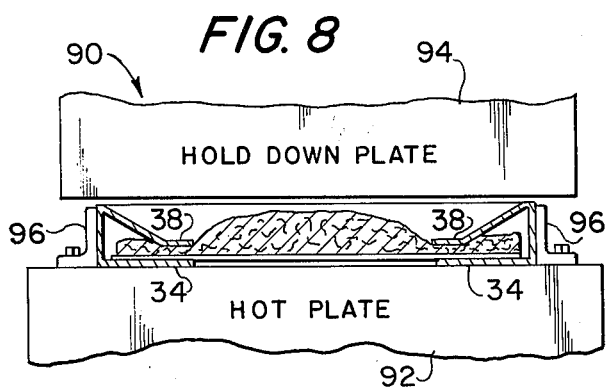
FIG. 8 illustrates a preheat station of an apparatus used in the assembly of the air filter panel.

Next, the partially assembled air filter panel is advanced by a conveyor (not shown) to a pre-heat station 90 (FIG. 8). The pre-heat station includes a lower hot plate 92 for engagement with rear wall sections 34 of the filter frame and a hold down plate 94 for engagement with the front of the filter frame to hold the rear wall section against the hot plate. Pre-heat station 90 is provided with positioning devices, e.g., a set of brackets 96 on hot plate 92, which receive filter frame 24 and hold the filter frame in its rectangular shape during the application of heat to rear wall sections 34 of the filter frame. The purpose of the pre-heat station is to raise the temperature of the adhesive previously applied at the edges of rear wall sections 34 sufficiently, e.g., 300° to 400°F, to reactivate the adhesive.

Thereafter, the air filter panel is advanced to a pinch station 100 (FIG. 9) to complete the assembly of the air filter panel. The pinch station includes a hot plate 102 which supports the air filter panel and maintains the temperature of the adhesive on rear wall sections 34 at the desired level, e.g., 300° to 400°F. In addition, the pinch station includes a heat and sealing fixture 104 which is mounted for movement relative to hot plate 102 under the action of an air cylinder 106. The purpose of heat and sealing fixture 104 is to raise the temperature of the adhesive previously applied to flanges 38 to the melt range, i.e., 300° to 400°F, and to simultaneously urge flanges 38 toward the rear walls 34 of the filter frame to cause the adhesive to penetrate through the compressed fibrous material of the filter element and bond flanges 38 to rear wall sections 34 of the filter frame. The adhesive is selected to have sufficient holding power upon relaxation of the pressure exerted on flanges 38 by heat and sealing fixture 104 to hold the flanges and rear wall sections together.

Figure 9:
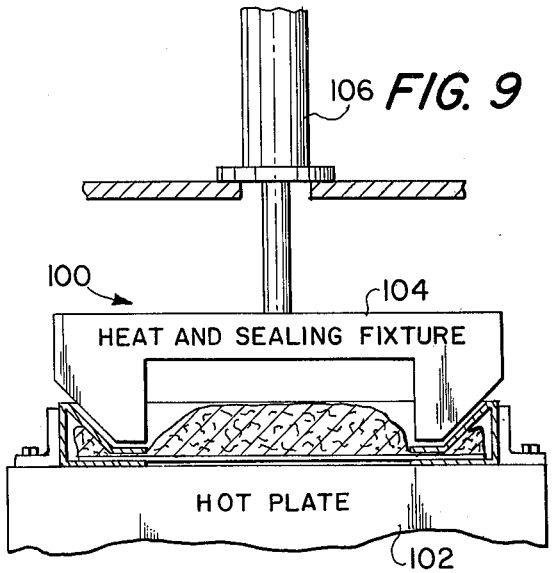
FIG. 9 illustrates a pinch station of the apparatus used in the assembly of the air filter panel.

As the final manufacturing step, the air filter panel is advanced to a cooling station (not shown), similar to the pinch station of FIG. 9, where it is cooled for a sufficient time to completely set the adhesive.

In the above manufacturing steps, the sequence of the heating operations to reactivate the adhesive is particularly important to the production of a desirable final product. At the pre-heat station (FIG. 8), only the adhesive on rear wall sections 34 is activated, while heating of the adhesive on flanges 38 is purposely eliminated to maintain the adhesive de-activated. Since heating of the adhesive on flanges 38 is only initiated upon contact with heat and sealing fixture 104 at the pinch station (FIG. 9), the possibility of melted adhesive being wiped on the fibrous filter material during downward movement of the fixture is substantially eliminated. Thus, the air filter panel produced is attractive in appearance with substantially no visible adhesive between the flanges and rear wall sections of the frame.

In the case of an air filter panel in which the filter components are mechanically fastened together, the adhesive applicator described above is eliminated. The formation of the elongated paper strip into the frame configuration is, however, otherwise identical to the above procedure. In addition, a suitable mechanical fastening apparatus, e.g., a stapling machine or a rivet assembly device, is used in place of the pre-heat and pinch apparatus previously described.

The air filter panel of the present invention includes a frame which is particularly advantageous for use with a conventional air conditioning unit. The frame includes a flat rear wall which, during air flow through the filter, is urged into sealing engagement with the flat, frame-like support plates around the air flow passage of the unit to insure that the entire air flow is directed through the filter element. Further, the front sloped wall of the filter frame acts as a baffle to direct the air flow toward the filter element.

In addition, the air filter panel has the advantage that the flat rear wall and triangular configuration of the frame permit the thickness of the filter element to be substantially equal to the full depth of the frame, i.e., to the width of the outer frame wall. Thus, in comparison with a frame structure which cannot accommodate a filter element equal in thickness to the full depth of the frame, the air filter panel of the present invention allows the mass of fibrous material of the filter element to be more loosely distributed to enhance the efficiency of the fibrous filter material in eliminating dust particles and other foreign material from the air flowing through the filter.

Figure 10:
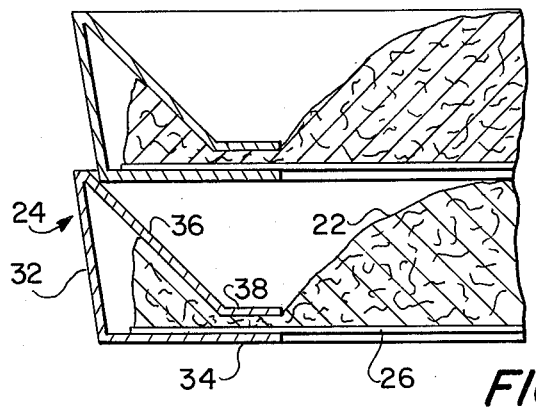
FIG. 10 illustrates an alternative embodiment of the air filter panel which facilitates stacking of a plurality of air filter panels for storage or shipment.

FIG. 10 illustrates an alternative embodiment of the air filter panel in which the triangular cross section of filter frame 24 includes an obtuse angle at the intersection of outer wall 32 and rear wall 34 of the frame. The construction of the alternative embodiment is otherwise identical to the structure previously described. Preferably, the obtuse angle of the triangular cross section is approximately 100°.

As shown in FIG. 10, the provision of the obtuse angle between the outer wall and rear wall of the frame cross section facilitates the arrangement of two or more air filter panels in a stacked configuration. Since the outer wall is inclined slightly inward from the front to the rear of the frame, the rear portion of one frame can be received within the front face of another frame to allow nesting of adjacent air filter panels. Thus, it is apparent that, in the alternative embodiment, less packaging space would be required for a stack of filters. The reduction in packaging space is a significant advantage in the storage or shipment of air filters.

The invention in its broader aspects is not limited to the specific details shown and described, and modifications may be made in the details of the air filter embodiments without departing from the principles of the present invention.

What is claimed is:

1. An air filter, comprising:
   a filter element of fibrous material; and
   a frame for supporting said filter element at its marginal edges;
   said frame comprising a strip of stiff paper scored along two spaced longitudinal lines and folded away from said longitudinal lines to form a trough for receiving said filter element, said strip also being folded transversely to form a closed configuration surrounding said filter element to receive said marginal edges of said filter element in said trough;
   said frame including an outer wall, a flat rear wall extending inward from said outer wall, and a front wall extending inward from said outer wall toward said filter element and sloping toward said rear wall;
   said front wall terminating in a flange disposed in a parallel relationship with said rear wall, said flange being secured to said rear wall with said filter element compressed therebetween to hold said frame and filter element together.

2. An air filter, comprising:
   a filter element of fibrous material; and
   a frame for supporting said filter element at its marginal edges;
   said frame comprising a strip of stiff paper scored along two spaced longitudinal lines and folded away from said longitudinal lines to form a trough for receiving said filter element, said strip also being folded transversely to form a closed configuration surrounding said filter element to receive said marginal edges of said filter element in said trough;
   said frame including an outer wall, a first side wall extending perpendicularly inward from said outer wall toward said filter element, and a second side wall extending inward from said outer wall toward said filter element and sloping toward said first side wall;
   said second side wall terminating in a flange disposed in a parallel relationship with said first side wall, said flange being secured to said first side wall with said filter element compressed therebetween to hold said frame and said filter element together.

3. An air filter of quadrangular shape, comprising:
   a filter element of fibrous material having a quadrangular shape;
   a porous backing sheet of quadrangular shape located adjacent to said filter element; and
   a frame surrounding said filter element and backing sheet for supporting said filter element and backing sheet adjacent to the marginal edges thereof;
   said frame comprising an elongated strip of stiff paper scored along two spaced longitudinal lines on the same side of said strip and folded away from said longitudinal lines to form a trough for receiving said filter element and also folded transversely at predetermined spaced locations to form a closed, quadrangular configuration which surrounds said filter element and backing sheet and receives said marginal edges of said filter element and backing sheet in said trough;
   said frame including an outer wall, a first side wall extending inwardly at right angles to said outer wall from said filter element, and a second side wall extending inwardly from said outer wall and sloping toward said first side wall;
   said strip being scored along an additional longitudinal line on its opposite side and folded away from said additional longitudinal line to provide a flange on said second side wall disposed at right angles to said outer wall, said flange being secured to said first side wall with said filter element compressed therebetween to hold said frame, filter element and backing sheet together.

4. An air filter of generally rectangular shape, comprising:
   a filter element of fibrous material having a generally rectangular shape;
   a frame surrounding said filter element and supporting said filter element adjacent to its marginal edges; and
   a generally rectangular backing sheet for said filter element including a plurality of air flow openings;
   said frame comprising an elongated strip of stiff paper scored along two spaced longitudinal lines on the same side of said strip and folded away from said longitudinal lines to form a trough for receiving said filter element, said strip also being scored along transverse lines at predetermined spaced locations on the same side of said strip and folded away from said transverse lines to form a closed, rectangular configuration which surrounds said filter element and receives said marginal edges of said filter element in said trough;
   said frame being substantially a right triangle in cross section and including an outer wall, a rear wall extending inwardly at right angles to said outer wall toward said filter element, and a front wall extending inwardly from said outer wall and sloping toward said rear wall, said backing sheet being located between said filter element and said rear wall of said frame;

said strip being scored along an additional longitudinal line on its opposite side and folded away from said additional longitudinal line to provide a flange on said front wall disposed in a parallel relationship with said rear wall, said flange being secured to said rear wall with said filter element compressed therebetween to hold said frame, filter element, and backing sheet together.

5. The air filter of claim 4, wherein said flange is adhesively secured to said rear wall.

6. The air filter of claim 4, wherein said flange is mechanically secured to said rear wall.

7. An air filter of generally rectangular shape, comprising:
   a filter element of fibrous material having a generally rectangular shape and a substantially uniform thickness;
   a frame surrounding said filter element and supporting said filter element adjacent to its marginal edges; and
   a generally rectangular backing sheet for said filter element including a plurality of air flow openings;
   said frame comprising an elongated strip of stiff paper scored along two spaced longitudinal lines on the same side of said strip and folded away from said longitudinal lines to form a trough for receiving said filter element, said strip also being scored along transverse lines at predetermined spaced locations on the same side of said strip and folded away from said transverse lines to form four frame sections into a closed, rectangular configuration which surrounds said filter element and receives said marginal edges of said filter element in said trough;
   each frame section being a right triangle in cross section and having an outer wall substantially equal in width to the thickness of said filter element, a rear wall extending inwardly at right angles to said outer wall toward said filter element, and a front wall extending inwardly from said outer wall toward said filter element and sloping toward said rear wall, said backing sheet being located between said filter element and said rear wall of said frame;
   said strip being scored along an additional longitudinal line on its opposite side and folded away from said additional longitudinal line to provide a flange on said front wall disposed at right angles to said outer wall, said flange being adhesively secured to said rear wall with said filter element compressed therebetween to hold said frame, filter element, and backing sheet together.

8. An air filter of generally rectangular shape, comprising:
   a filter element of fibrous material having a generally rectangular shape;
   a frame surrounding said filter element and supporting said filter element adjacent to its marginal edges; and
   a generally rectangular backing sheet for said filter element including a plurality of air flow openings;
   said frame comprising an elongated strip of stiff paper scored along two spaced longitudinal lines on the same side of said strip and folded away from said longitudinal lines to form a trough for receiving said filter element, said strip also being folded transversely at predetermined spaced locations to form a closed, rectangular configuration which surrounds said filter element and receives said marginal edges of said filter element in said trough;
   said frame being triangular in cross section and including an outer wall, a rear wall extending inwardly at an obtuse angle to said outer wall toward said filter element, and a front wall extending inwardly from said outer wall and sloping toward said rear wall, said backing sheet being located between said filter element and said rear wall of said frame;
   said front wall terminating in a flange disposed in a parallel relationship with said rear wall, said flange being secured to said rear wall with said filter element compressed therebetween to hold said frame, filter element, and backing sheet together.

9. The air filter of claim 8, wherein said obtuse angle is substantially 100°.

10. The air filter of claim 8, wherein said flange is adhesively secured to said rear wall.

11. The air filter of claim 8, wherein said flange is mechanically secured to said rear wall.

12. The air filter of claim 8, wherein:
   said stiff paper strip is scored along an additional longitudinal line on the opposite side of said strip adjacent to the edge of said front wall to define said flange, said flange being folded away from said additional longitudinal line and disposed in a parallel relationship with said rear wall.

13. The air filter of claim 8, wherein:
   said stiff paper strip is scored along transverse lines at said predetermined locations and folded away from said transverse lines to form said paper strip into said closed rectangular configuration.

* * * * *